No. 656,342. Patented Aug. 21, 1900.
R. CARLTON.
PICTURE FRAME.
(Application filed Jan. 31, 1900.)
(No Model.)
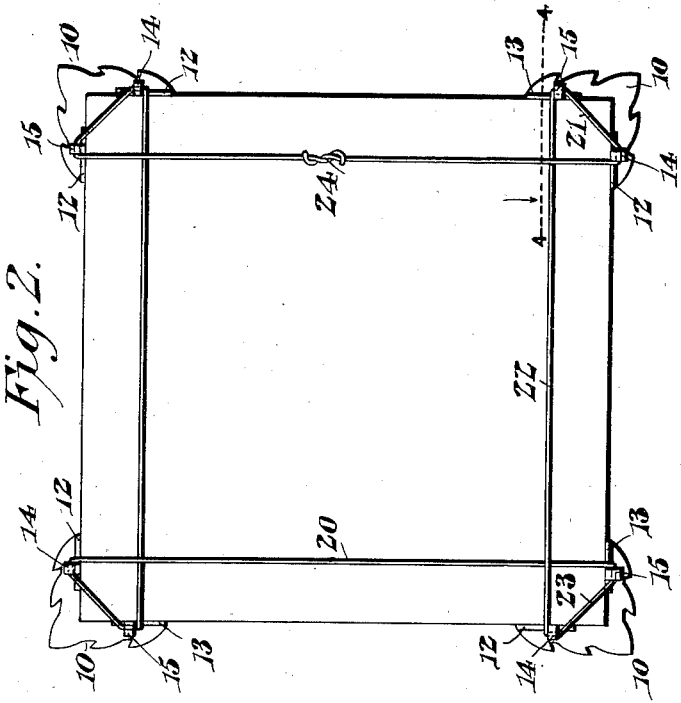
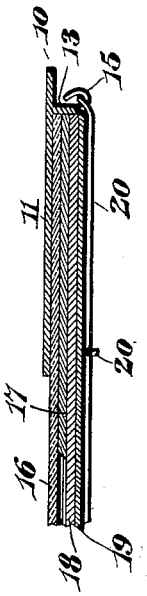
Robert Carlton, Inventor

UNITED STATES PATENT OFFICE.

ROBERT CARLTON, OF JONESBOROUGH, ARKANSAS.

PICTURE-FRAME.

SPECIFICATION forming part of Letters Patent No. 656,342, dated August 21, 1900.

Application filed January 31, 1900. Serial No. 3,509. (No model.)

*To all whom it may concern:*

Be it known that I, ROBERT CARLTON, a citizen of the United States, residing at Jonesborough, in the county of Craighead and State of Arkansas, have invented a new and useful Mount for Pictures, Photographs, and the Like, of which the following is a specification.

My invention relates to improvements in mounts for pictures, photographs, and the like of that class wherein separate members are substituted for a continuous marginal or boundary frame, such as is commonly used in framing pictures.

One object that I have in view is to firmly bind a glass panel, the picture, and other parts associated therewith within the series of independent members, so as to obviate all tendency of the several parts to become displaced.

A further object is to provide each independent member with means to secure firm bearing thereof against the mount and provide for the expeditious application of a binder, so as to hold all the parts securely together, whereby a series of independent members may be used on different sizes of mounts.

With these ends in view the invention contemplates a mount comprising a series of members, each having one or more edge bearings for a transparent panel and other parts associated therewith, hooks on said members, and a binder fitted to the hooks and engaging with the mount at the corners thereof, so as to bind the parts firmly together.

The invention further consists in the novel construction and arrangement of parts, as will be hereinafter fully described and claimed.

In the drawings, Figure 1 is a front view of a mount having corner members embodying my invention. Fig. 2 is a rear view of the structure shown by Fig. 1 and illustrating one means for binding the several parts of the mount firmly together. Fig. 3 is a detail perspective view of one of the corner members removed from the mount represented by Figs. 1 and 2. Fig. 4 is a cross-sectional view taken in the plane of the dotted line 4 4 of Fig. 2.

The same numerals of reference are used to indicate like and corresponding parts in each of the several figures of the drawings.

I have shown by Figs. 1 and 2 of the drawings a photographic or picture mount which is of square form, and the independent members which constitute the frame are represented as adapted to have bearing or engagement edgewise with the parts of the mount; but I would have it distinctly understood that the shape and dimensions of the mount may be varied within wide limits. My invention contemplates the employment of a number of independent members for holding and binding the parts of the mount in secure relation one to the other, and these members are of an ornamental character, and they are constructed with bearing-faces for the edges of the mount and also provided with means for the attachment of a binder. In the use of a square, rectangular, or other angular mount one of the members is applied to each corner of the said mount, and in the square style of mount shown by the drawings four members 10 are employed, one of which is provided at each corner. Each member may be made of metal or of any other suitable material, and it is provided with an ornamental surface 11, the bearing-flanges 12 13, and the hooks 14 15. When the corner member is of cast metal, the bearing-flanges and the hooks may be made integral with the base or plate of the member; but it is evident that the base of the member may be made of one material and the bearing-flanges and hooks of another material, in which event the flanges are united to the base in any preferred way. In the embodiment shown the bearing-flange 12 is arranged on the base of the member in a position at right angles to the other flange 13, and these two flanges are disposed on the rear side of the base and within the edges thereof, so that the flanges and the hooks are not visible in viewing the mount from its front side. Each hook is made as an integral part of one flange, and it is curved or extended beyond the plane of the flange so as to extend over the base, and the hooks on the two flanges face in opposite directions.

It is usual in the art to employ a mount consisting of a number of pieces—such, for example, as the glass panel 16, the mat 17, the picture 18, and the backing 19. The mat may be of cardboard or other material known to the art, and the backing 19 may be of wood, paper, or other material. All the parts of the mount are applied laterally together in a compact relation, and according to my invention the flanges 12 13 of the corner members must be of a depth less than the aggregate thickness of the parts comprising the mount, as shown by Fig. 4, so that the hooks 14 15 will not lie in the same transverse plane as the backing 19.

It is to be understood that after the several parts of the mount shall have been assembled laterally the members 10 are fitted against the corners of the panel 16, so that the flanges 12 13 will engage with the edges of the several layers forming the mount, and I employ a binder which is connected with the hooks of the several members 10 and is arranged to engage with the back 19 of the mount in a manner to firmly bind the several layers of the mount and to connect the series of members 10. This binder may be and preferably is in the form of a wire or cord 20, which is arranged in the manner represented in Fig. 2—that is to say, one length of the wire fits around the hook 14 of the lower right corner-piece 10, then extends diagonally across the mount, as at 21, to and around the hook 15, thence across the back of the mount, as at 22, around the hook 15 on the lower left corner-piece 10, thence diagonally across another corner of the mount, as at 23, to and around the hook 14 of the same corner-piece, and from thence the wire or cord is carried across the mount to the upper left-hand corner-piece, engaged with its hooks in a similar way, and finally across the mount to the upper right-hand corner-piece, so as to engage with the hooks thereof, the ends of the wire being twisted or united together, as at 24. I would have it understood, however, that I do not confine myself strictly to the use of a cord or wire, because I may employ a rod adapted to extend diagonally across the corners of a picture or mount. It is also to be understood that it is not necessary to use a mat and the backing in the mount, because either or both of these parts may be omitted.

The mount may be of circular, oval, or other curved form, and in this event the bearing flange or flanges of the members will be fashioned so as to conform to the edges of the mount. One or more hooks may be used on each member, and the binding cord or wire is arranged to connect the members and to bind the parts of the mat together.

One of the peculiar features of my invention is the arrangement of the hooks within the back 19 of the mount, so that the binding cord or wire is compelled to pass over the edge of the back, and when said wire is drawn taut it exerts pressure on the back, so as to force the layers of the mount laterally into close relation, thereby clamping the several parts of the mount together, as well as holding the individual members in proper relation. This arrangement and adaptation of parts overcomes any liability of displacement of the members 10 or of the picture moving out of position between the mat and the backing. Of course any desired ornamentation may be given to the exposed face of the members 10.

Changes within the scope of the appended claims may be made in the form and proportion of some of the parts, while their essential features are retained and the spirit of the invention is embodied. Hence I do not desire to be limited to the precise form of all the parts as shown, reserving the right to vary therefrom.

Although I have shown and described the edge-bearing flanges as of less depth than the aggregate thickness of the parts comprising the mount in order to secure the binding action of the cord or wire against the mount, I do not desire to strictly limit myself to this specific proportion of the edge-bearing flange with relation to the parts of the mount. The object of such arrangement is, primarily, to bring the hook for the binding cord or wire below or within the plane of the backing, which forms a part of the mount; but this object may be attained by disposing the hooks below or within the edge of the bearing-flange and leave the latter of a depth equal to or greater than the parts of the mount. Such a construction is advantageous because provision is made for confining the edges of the parts comprising the mount, and at the same time the binding cord or wire is arranged and connected to the hook so as to secure the desired binding action on the mount. As such construction of the edge-bearing flange and hook is obvious from the foregoing description and capable of being readily embodied by a skilled mechanic, I have not considered it necessary to illustrate the construction or to further describe the same.

Having thus described the invention, what I claim is—

1. The combination with a mount composed of a number of layers, of a plurality of individual corner members disposed against the front face and the edges of the mount, and a binder extending over the back of the mount and connected to the several corner members in a plane intermediate of the front and back of the mount, whereby the tightening of the binder serves to draw the layers of the mount together and to draw the members into close contact with the edges thereof.

2. The combination with a mount composed of a number of layers, of a plurality of corner members disposed against the front face of the mount and having bearing-flanges disposed against the edges thereof, and a continuous binder extending over the back of the mount and connected to the members in a plane between the front and back of said mount.

3. The combination with a mount composed of a number of layers, of individual corner members disposed against the front face of the mount and comprising angularly-related flanges, hooks carried by the flanges and disposed in different directions, and a binder passed over the back of the mount and engaging with the hooks in a plane intermediate of the front and back of said mount.

4. A corner member of the character described, comprising a plate, angularly-related bearing-flanges extending from one face of the plate and removed from the edges thereof, and hooks carried by and extending upon one side only of said flanges.

5. A corner member of the character described comprising an ornamental plate, angularly-related bearing-flanges extending at right angles to said plate and removed from the adjacent edges thereof, and hooks carried by said flanges and extending only upon the outer side thereof, to remove said hooks and a binder secured thereto from contact with the edges of a mount when the corner member is in use.

In testimony that I claim the foregoing as my own I have hereto affixed my signature in the presence of two witnesses.

ROBERT CARLTON.

Witnesses:
E. W. MOONEY,
CHAS. RARICK.